US012477279B2

(12) United States Patent
Yang et al.

(10) Patent No.: US 12,477,279 B2
(45) Date of Patent: Nov. 18, 2025

(54) MULTIFUNCTIONAL SOUNDER

(71) Applicant: AAC Microtech (Changzhou) Co., Ltd., Jiangsu (CN)

(72) Inventors: Huhu Yang, Changzhou (CN); Wei Wei, Changzhou (CN); Zhaoyu Yin, Changzhou (CN); Zhizhu Chen, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 216 days.

(21) Appl. No.: 18/542,827

(22) Filed: Dec. 18, 2023

(65) Prior Publication Data

US 2024/0340588 A1 Oct. 10, 2024

Related U.S. Application Data

(63) Continuation of application No. PCT/CN2023/087025, filed on Apr. 7, 2023.

(51) Int. Cl.
*H04R 7/04* (2006.01)
*H04R 9/06* (2006.01)

(52) U.S. Cl.
CPC ................. *H04R 7/04* (2013.01); *H04R 9/06* (2013.01)

(58) Field of Classification Search
CPC ............. H04R 7/04; H04R 9/06; H04R 9/025
See application file for complete search history.

(56) References Cited

FOREIGN PATENT DOCUMENTS

CN 113794974 B * 2/2025 ........... H04R 31/006

* cited by examiner

*Primary Examiner* — Tuan D Nguyen
(74) *Attorney, Agent, or Firm* — Wiersch Law Group

(57) ABSTRACT

The present disclosure provides a multifunctional sounder, including a casing having an accommodating cavity, and a sounding unit and at least one driving coil group that are arranged in the accommodating cavity. The sounding unit includes a sounding diaphragm system and a magnetic circuit system configured to drive the sounding diaphragm system along a first direction. The magnetic circuit system includes a main magnet and at least one secondary magnet group. Each secondary magnet group includes a plurality of secondary magnets. Each driving coil group includes at least one driving coil each corresponding to a respective secondary magnet group, and an orthographic projection of each driving coil group along the first direction misalign with the main magnet. Compared with related technologies, when adjusting the height of the sounder, only thicknesses of the secondary magnets need to be adjusted, thereby causing relatively small impact on the acoustic performance of the sounder.

10 Claims, 12 Drawing Sheets

MULTIFUNCTIONAL SOUNDER

CROSS REFERENCE TO RELATED APPLICATIONS

The present application is a continuation of PCT Patent Application No. PCT/CN2023/087025, filed Apr. 7, 2023, which is incorporated by reference herein in its entirety.

TECHNICAL FIELD

The present disclosure relates to the field of electronic devices, and in particular to a multifunctional sounder.

BACKGROUND

With the development of electronic technology, portable consumer electronic devices are increasingly sought after by people, such as mobile phones, handheld game consoles, navigation devices, or handheld multimedia entertainment devices. These electronic devices generally provide system feedback through voice and/or vibration, such as phone call prompts, navigation prompts, vibration feedback of game consoles, or the like.

A device that provides system feedback in related technologies has a sounding unit and a driving coil. The sounding unit has a main magnet and a secondary magnet, the driving coil spans across the main and secondary magnets, and the sounding unit and the driving coil share an edge magnet and a center magnet of the sounding unit. When a height of the driving coil needs to be adjusted, heights of both the main and secondary magnets must be adjusted accordingly, resulting in a significant impact on the acoustic performance.

SUMMARY

The present disclosure aims to provide a multifunctional sounder, in order to address the technology problem in the related technologies.

The present disclosure provides a multifunctional sounder, including:

- a casing, having an accommodating cavity;
- a sounding unit, arranged in the accommodating cavity; and
- at least one driving coil group, arranged in the accommodating cavity.

The sounding unit includes a sounding diaphragm system and a magnetic circuit system configured to drive the sounding diaphragm system to vibrate and sound along a first direction. The magnetic circuit system includes a main magnet and at least one secondary magnet group arranged to surround the main magnet to form a magnetic gap. Each secondary magnet group of the at least one secondary magnet group includes a plurality of secondary magnets arranged in a second direction, each two adjacent secondary magnets of the plurality of secondary magnets have polarities opposite to each other, and the second direction is perpendicular to the first direction. Each driving coil group of the at least one driving coil group includes at least one driving coil, each driving coil group of the at least one driving coil group corresponds to a respective secondary magnet group of the at least one secondary magnet group, and an orthographic projection of each driving coil group of the at least one driving coil group along the first direction misalign with the main magnet.

As an improvement, in the second direction, one respective driving coil is arranged over an intermediate region between two respective adjacent secondary magnets of the plurality of secondary magnets, the one respective driving coil includes a first coil portion and a second coil portion, an orthographic projection of the first coil portion along the first direction falls on one secondary magnet of the two respective adjacent secondary magnets, and an orthographic projection of the second coil portion along the first direction falls on an other secondary magnet of the two respective adjacent secondary magnets.

As an improvement, the first coil portion and the second coil portion are enclosed to form a through hole for magnetic flux lines arranged over the intermediate region between the two respective adjacent secondary magnets.

As an improvement, each secondary magnet group of the at least one secondary magnet group includes three secondary magnets, each driving coil group of the at least one driving coil group includes two driving coils, and each driving coil of the two driving coils corresponds to two respective adjacent secondary magnets of the three secondary magnets.

As an improvement, the multifunctional sounder includes two driving coil groups symmetrically arranged on either sides of the main magnet along a third direction, wherein the magnetic circuit system includes two secondary magnet groups symmetrically arranged on either sides of the main magnet along the third direction, and the first direction is perpendicular to a plane formed by the second direction and the third direction.

As an improvement, the magnetic circuit system further includes a main pole core arranged on the main magnet and a secondary pole core including a first secondary pole core portion and a second secondary pole core portion. The first secondary pole core portion is arranged on one secondary magnet group of the two secondary magnet groups, the second secondary pole core portion is arranged on an other secondary magnet group of the two secondary magnet groups, and the first secondary pole core portion and the second secondary pole core portion are enclosed to form a first through hole arranged to align with the main magnet.

As an improvement, the magnetic circuit system further includes an upper magnet arranged on a side of the main pole core away from the main magnet.

As an improvement, an elastic connecting part and a vibration block are arranged in the accommodating cavity, the at least one driving coil group is arranged on the vibration block, and the elastic connecting part is connected between the casing and the vibration block.

As an improvement, a second through hole is defined on the vibration block, an orthographic projection of the main magnet along the first direction falls in the second through hole, and both of an orthographic projection of each driving coil group of the at least one driving coil group along the first direction and an orthographic projection of each secondary magnet group of the at least one secondary magnet group along the first direction partially fall in the second through hole.

As an improvement, the magnetic circuit system further includes a magnet yoke arranged to align with the main magnet, and an orthographic projection of each secondary magnet group of the at least one secondary magnet group along the first direction misaligns with the magnet yoke.

Compared with the related technologies, in the present disclosure, the driving coil groups are configured to corresponds to only the secondary magnet groups. In this way, when adjusting the height of the sounder, only thicknesses of the secondary magnets need to be adjusted, without need of adjusting the thickness of the main magnet, thereby causing relatively small impact on the acoustic performance of the sounder.

LIST OF REFERENCE NUMERALS

- 10—casing, 11—accommodating cavity, 111—front cavity, 112—back cavity, 12—main casing, 121—sound-emitting opening, 13—secondary casing, 14—cover plate;
- 20—sounding diaphragm system, 21—sounding diaphragm, 211—vibration diaphragm, 2111—first curved annulus, 2112—first outer flanging, 2113—first inner flanging, 212—dome, 22—sounding coil, 23—sound-emitting block, 231—sound-emitting channel, 232—sealing ring, 233—sealing plate, 24—cone bracket, 25—framework, 251—main body of framework, 252—bending part of framework, 253—third through hole, 254—installing part of framework, 26—second flexible circuit board;
- 30—magnetic circuit system, 31—main magnet, 32—secondary magnet, 33—magnetic gap, 34—main pole core, 35—secondary pole core, 351—first secondary pole core portion, 352—second secondary pole core portion, 353—first through hole, 36—upper magnet, 37—magnet yoke, 38—elastic support part;
- 40—vibration system, 41—driving coil, 411—first coil portion, 412—second coil portion, 413—through hole for magnetic flux lines, 42—elastic connecting part, 421—planar support part, 422—vertical connecting part, 43—vibration block, 431—main body of vibration block, 432—bending part of vibration block, 433—second through hole, 44—support plate, 441—support rib, 45—first flexible circuit board;
- 50—main circuit board;
- D1—first direction;
- D2—second direction;
- D3—third direction.

DETAILED DESCRIPTION OF EMBODIMENTS

The embodiments described below with reference to the accompanying drawings are illustrative and intended only to explain the present disclosure, and shall not be interpreted as limitations to the present disclosure.

Referring to FIGS. 1 to 19, embodiments of the present disclosure provide a multifunctional sounder which is applicable to electronic devices and is configured to provide feedback and prompt by sounding and/or vibration.

Figure 5:
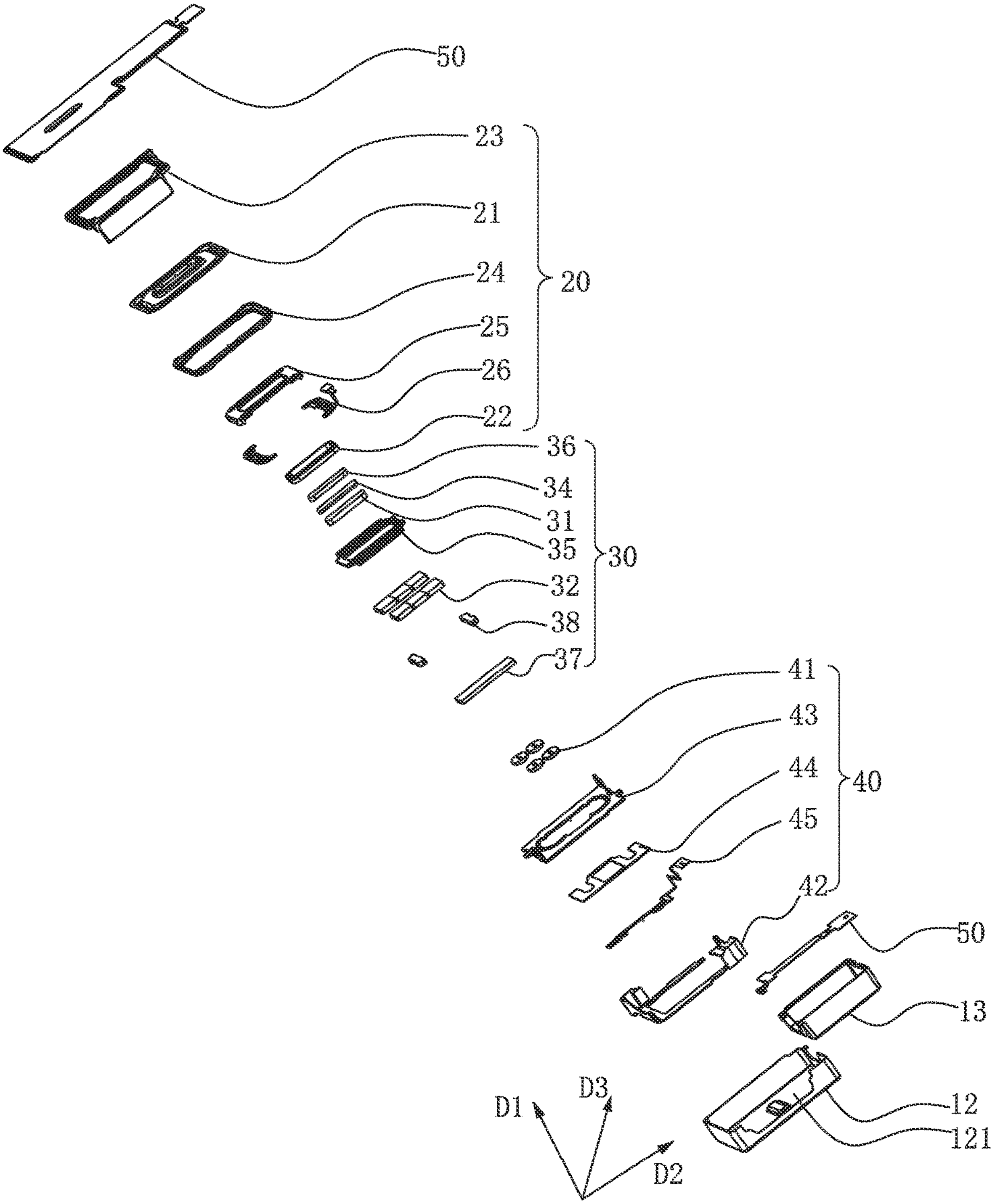
FIG. 5 is an exploded schematic diagram of the overall structure of the multifunctional sounder according to some embodiments of the present disclosure.

For the convenience of describing the structure of the multifunctional sounder, a reference coordinate system is introduced. As shown in FIG. 5, the first direction D1, the second direction D2, and the third direction D3 are perpendicular to each other, and the first direction D1 is perpendicular to a plane formed by the second direction D2 and the third direction D3.

In some embodiments, the multifunctional sounder includes a casing 10 having an accommodating cavity 11, and a sounding unit and a vibration system 40 that are arranged in the accommodating cavity 11. The sounding unit is configured to provide feedback by sounding, and the vibration system 40 is configured to provide feedback by vibration. Those skilled in the art shall understand that in some other embodiments, the sounding unit may be configured to provide feedback by sounding and vibration, concurrently.

Figure 1:
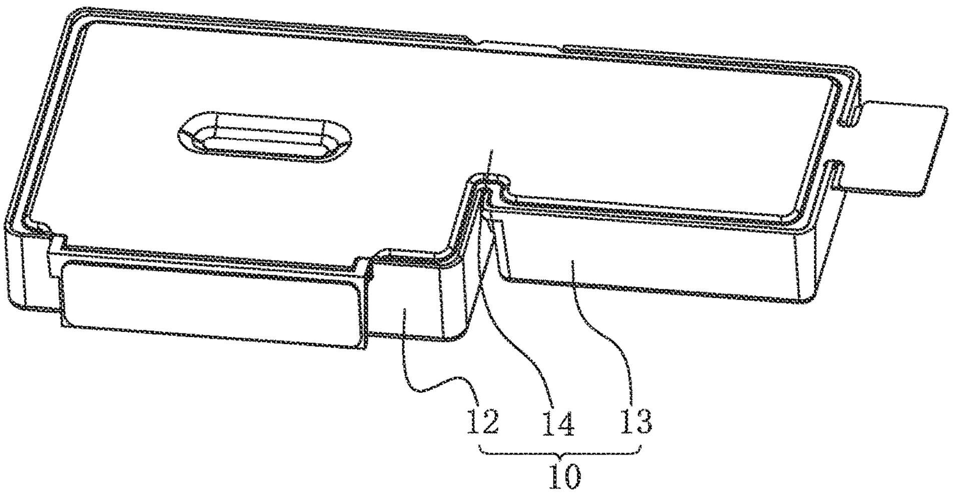
FIG. 1 is an axonometric view of an overall structure of the multifunctional sounder according to some embodiments of the present disclosure.
Figure 2:
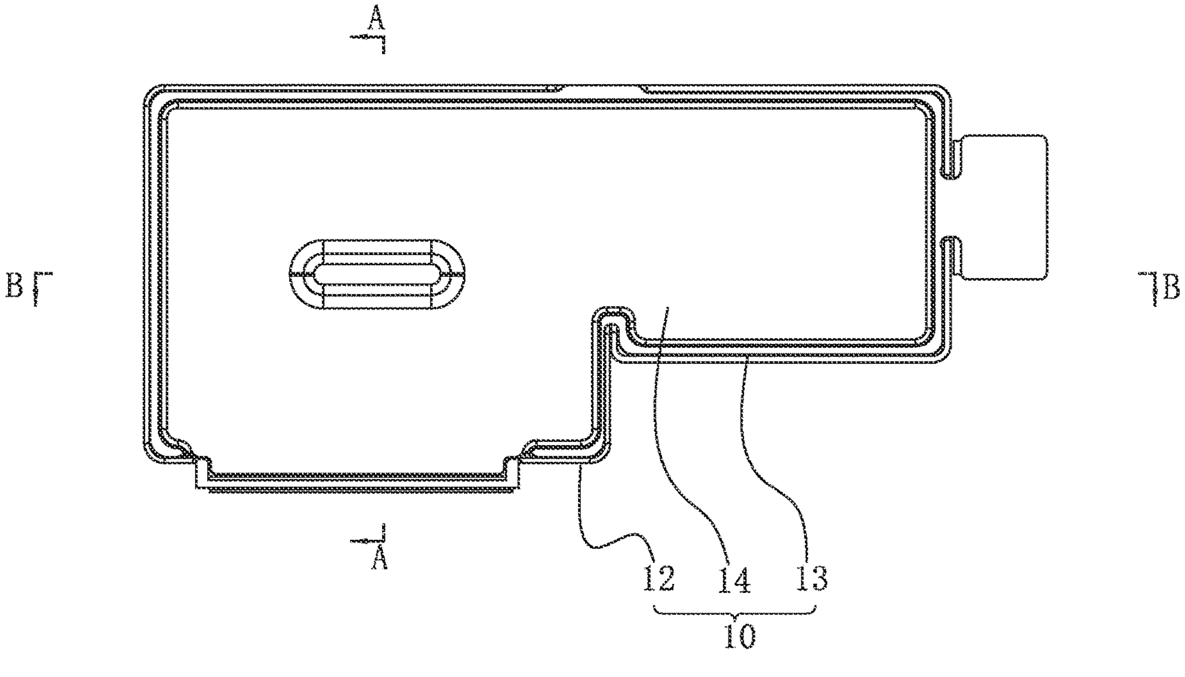
FIG. 2 is a top view of the overall structure of the multifunctional sounder according to some embodiments of the present disclosure.
Figure 3:
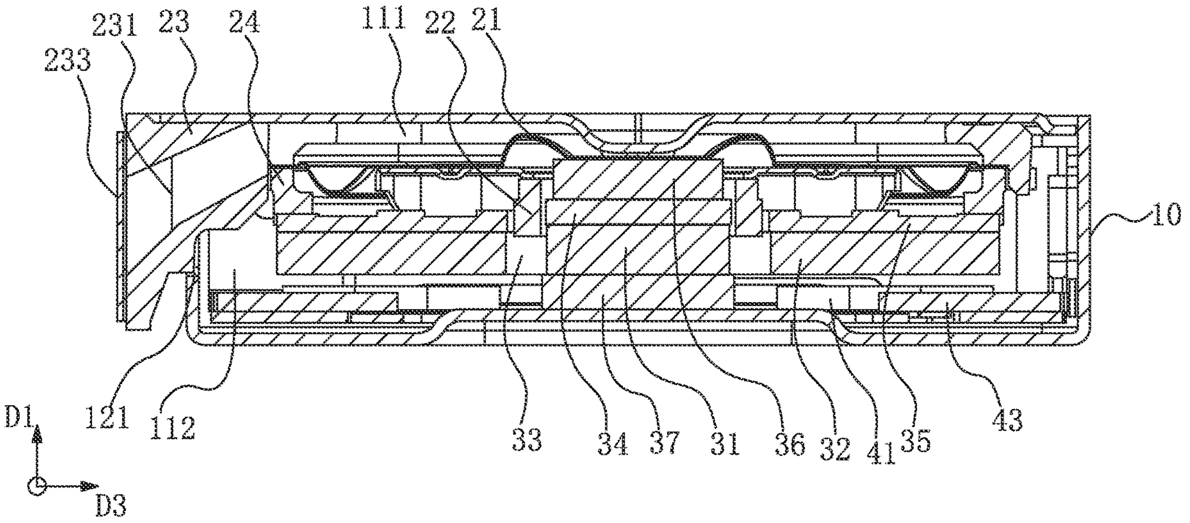
FIG. 3 is a sectional view along A-A direction in FIG. 2.
Figure 4:
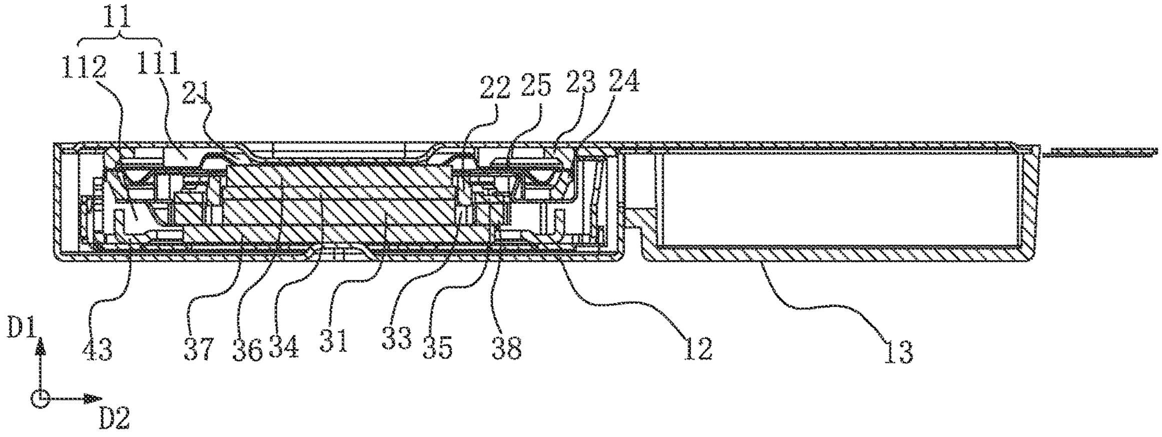
FIG. 4 is a sectional view along B-B direction in FIG. 2.

Referring to FIGS. 3, 4 and 5, the sounding unit includes a sounding diaphragm system 20 and a magnetic circuit system 30 configured to drive the sounding diaphragm system 20 to vibrate and sound along a first direction D1. The sounding diaphragm system 20 divides the accommodating cavity 11 into a front cavity 111 and a back cavity 112. A sound-emitting opening is defined on the casing 10, the sound-emitting opening is configured to communicate with the front cavity 111 and allow sound to pass through. The back cavity 112 may be filled with sound-absorbing powder to improve the low-frequency acoustic performance of the sounder.

Figure 7:
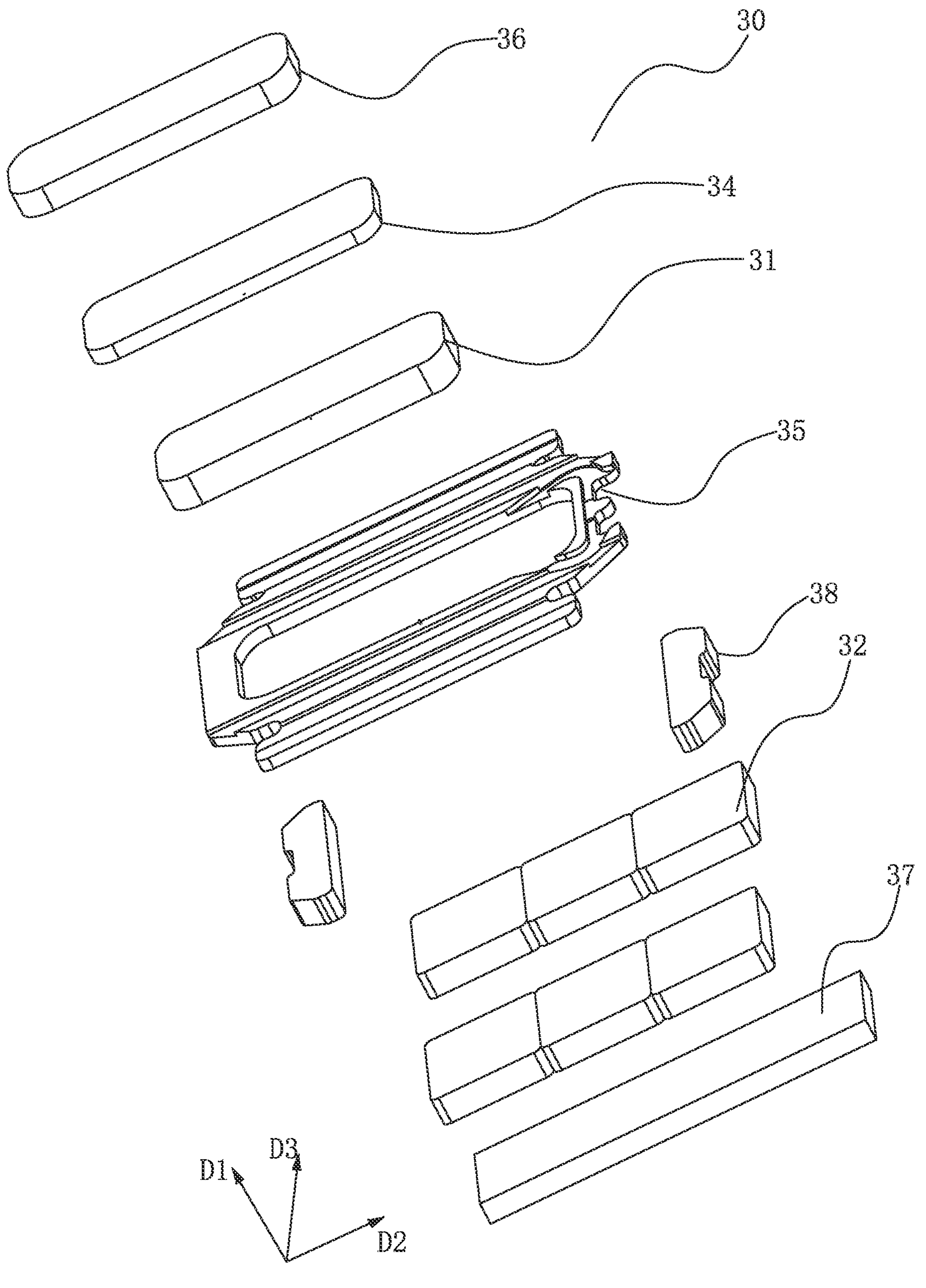
FIG. 7 is an exploded schematic diagram of the magnetic circuit system according to some embodiments of the present disclosure.
Figure 11:
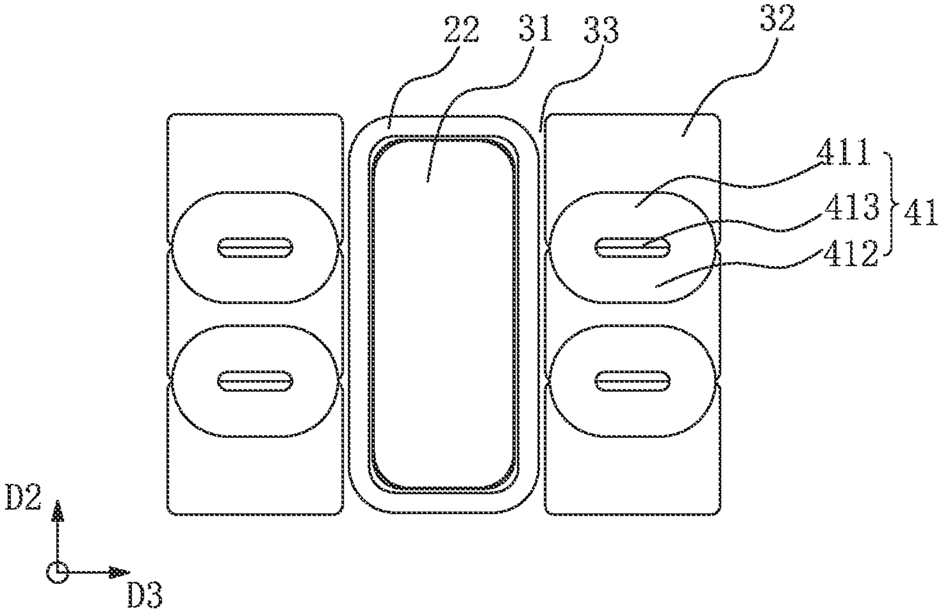
FIG. 11 is a schematic diagram showing a fitted status of the secondary magnet groups with the driving coil groups according to some embodiments of the present disclosure.

Referring to FIGS. 3, 7 and 11, the magnetic circuit system 30 includes a main magnet 31 and at least one secondary magnet group arranged to surround the main magnet 31 to form a magnetic gap 33. Each secondary magnet group of the at least one secondary magnet group includes a plurality of secondary magnets 32 arranged in the second direction D2. Each secondary magnet group includes at least two secondary magnets 32, and each two adjacent secondary magnets 32 have polarities opposite to each other. For example, a polarity of an end of a secondary magnet 32 close to the front cavity 111 is S, then a polarity of an end of an adjacent secondary magnet 32 close to the front cavity 111 is N.

Referring to FIGS. 3, 4, 8 and 11, the vibration system 40 includes at least one driving coil group arranged to be in one-to-one correspondence to the at least one secondary magnet group. Each driving coil group of the at least one driving coil group includes at least one driving coil 41. In the first direction D1, the at least one driving coil group is on a side of the at least one secondary magnet group away from the front cavity 111. There is a height difference between a driving coil group and a corresponding secondary magnet group. An orthographic projection of each driving coil group of the at least one driving coil group along the first direction D1 misalign with the main magnet 31 to facilitate adjustment of a total height of the sounder. The height of the sounder can be adjusted by adjusting the thicknesses of the secondary magnets 32, without need of adjusting the thickness of the main magnet 31, thereby causing relatively small impact on the acoustic performance of the sounder.

In some embodiments, the vibration system 40 functions as a mover, and the sounding unit including the main magnet 31 and the secondary magnets 32 functions as a stator. The driving coils 41 drive the vibration system 40 to vibrate using interaction forces between the driving coils 41 and the secondary magnets 32, thereby achieving vibration feedback of the sounder. In this way, the sounder can have both vibration feedback and voice feedback functions, and the increase in thickness of the sounder can be reduced.

When a respective secondary magnet group has two secondary magnets 32, a respective driving coil group has one driving coil 41, and the driving coil 41 is arranged over an intermediate region between the two adjacent secondary magnets 32. When a respective secondary magnet group has more than two secondary magnets 32, a respective driving coil group has a plurality of driving coil 41 arranged at intervals along the second direction D2, and one respective driving coil 41 is arranged over an intermediate region between two respective adjacent secondary magnets 32. That is to say, the number of the driving coils 41 is one less than the number of the secondary magnets 32. Referring to FIG. 11, the one respective driving coil 41 includes a first coil portion 411 and a second coil portion 412. An orthographic projection of the first coil portion 411 along the first direction D1 falls on one secondary magnet 32 of the two respective adjacent secondary magnets, and an orthographic projection of the second coil portion 412 along the first direction D1 falls on the other secondary magnet 32 of the two respective adjacent secondary magnets. In this way, magnetic induction lines pass through the one respective drive coil 41, thereby providing driving force to the one respective drive coil 41. Moreover, the magnetic induction lines are denser, which is conducive to improving the performance of the sounder.

Referring to FIG. 11, the first coil portion 411 and the second coil portion 412 are enclosed to form a through hole 413 for magnetic flux lines arranged over the intermediate region between the two respective adjacent secondary magnets 32. In some embodiments, the through hole 413 for magnetic flux lines is a kidney-shaped hole, and a long axis of the through hole 413 for magnetic flux lines extends along the third direction D3. The long axis of the through hole 413 for magnetic flux lines is positioned over a junction line of the two respective adjacent secondary magnets 32, or when there is a gap between the two respective adjacent secondary magnets 32, the long axis of the through hole 413 for magnetic flux lines is positioned over a centerline of this gap. In this way, each of the first coil portion 411 and the second coil portion 412 is arranged to completely correspond to one respective secondary magnet 32, the interaction force between the one respective driving coil 41 and the two respective secondary magnets 32 can be increased, thereby ensuring the driving of the sounding unit.

Referring to FIG. 11, a respective secondary magnet group has three secondary magnets 32, and a polarity of the secondary magnet 32 in the middle is opposite to those of the two secondary magnets 32 arranged on either sides. For example, a polarity of an end of the secondary magnet 32 in the middle facing towards a respective driving coil group is N, then polarities of ends of the two secondary magnets 32 arranged on either sides facing towards the respective driving coil group are S. Accordingly, the respective driving coil group includes two driving coils 41 having the same structure and arranged to separate from each other along the second direction D2. Each driving coil 41 is arranged to correspond to two respective adjacent secondary magnets 32 of the three secondary magnets 32.

Referring to FIGS. 3, 4, 7 and 11, the main magnet 31 extends along the second direction D2. The multifunctional sounder includes two driving coil groups symmetrically arranged on either sides of the main magnet 31 along the third direction D3, and the magnetic circuit system includes two secondary magnet groups symmetrically arranged on either sides of the main magnet 31 along the third direction D3. An annular magnetic gap 33 is formed between the secondary magnet groups and the main magnet 31. In this way, the interaction force between the driving coils 41 and the secondary magnets 32 is uniform. By increasing the number of the driving coils 41 and the secondary magnets 32 in a limited space, the alignment area between the driving coils 41 and the secondary magnets 32 can be increased, thereby increasing the interaction force between the driving coils 41 and the secondary magnets 32, and obtaining more significant effect of vibration feedback.

Referring to FIGS. 3, 4, 7 and 16, the magnetic circuit system 30 further includes a main pole core 34 arranged on the main magnet 31 and a secondary pole core 35 including a first secondary pole core portion 351 and a second secondary pole core portion 352. The main pole core 34 has a block structure, and the secondary pole core 35 has an annular structure. The first secondary pole core portion 351 is arranged on one secondary magnet group of the two secondary magnet groups, the second secondary pole core portion 352 is arranged on the other secondary magnet group of the two secondary magnet groups, and the first secondary pole core portion 351 and the second secondary pole core portion 352 are enclosed to form a first through hole 353 arranged to align with the main magnet 31. The main magnet 31 is accommodated in the first through hole, and each of sizes of the first secondary pole core portion 351 and the second secondary pole core portion 352 is adaptive to a size of a respective secondary magnet group. The annular secondary pole core 35 can effectively improve the magnetic field uniformity in the diagonal region of the main magnet 31, and the overall electro-acoustic performance of the sounder can be effectively improved.

Referring to FIGS. 3 and 7, the magnetic circuit system 30 further includes an upper magnet 36 arranged on a side of the main pole core 34 away from the main magnet 31, a magnet yoke 37 and elastic support parts 38. The upper magnet 36 can not only fix and support the sounding diaphragm 21, but also improve BL, thereby improving the performance of the sounder.

The magnet yoke 37 usually does not generate a magnetic field, and is only a soft magnetic material for magnetic field transmission in the magnetic circuit. The magnet yoke 37 is usually made of soft iron, A3 steel, and soft magnetic alloys with high permeability. The magnet yoke 37 can transmit the magnetic field generated by the driving coils 41 and the secondary magnets 32 to desired position and form a magnetic field. The main magnet 31 and the secondary magnets 32 all support on the magnet yoke 37, an orthographic projection of the main magnet 31 along the first direction D1 falls on the magnet yoke 37, and an orthographic projection of each secondary magnet group of the at least one secondary magnet group along the first direction D1 misaligns with the magnet yoke 37. There are two elastic support parts 38 symmetrically arranged on either sides of the main magnet 31 along the third direction D3, and the secondary pole core 35 supports on the elastic support parts 38.

Figure 8:
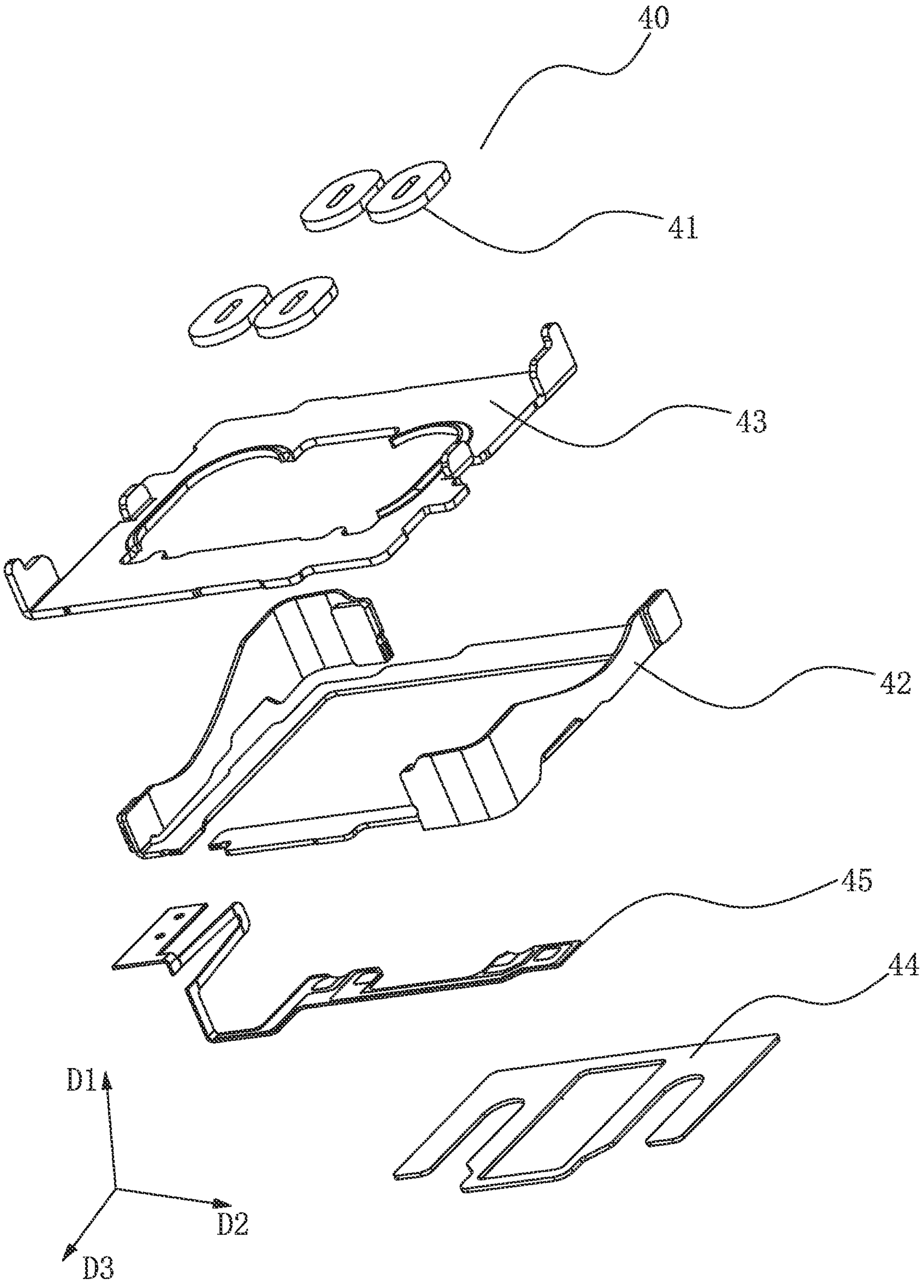
FIG. 8 is an exploded schematic diagram of a vibration system according to some embodiments of the present disclosure.

Referring to FIG. 8, the vibration system 40 further includes an elastic connecting part 42 and a vibration block 43. The at least one driving coil group is arranged on the vibration block 43, and the elastic connecting part 42 is connected between the casing 10 and the vibration block 43. The vibration block 43 is suspended in the accommodating cavity 11 by the elastic connecting part 42. Under the action of the at least one driving coil group, the vibration block 43 can vibrate along the second direction D2 to provide vibration feedback. In other words, the driving coils 41 and the vibration block 43, as a whole, function as a mover, and the sounding unit including the main magnet 31 and the secondary magnets 32 functions as a stator. The driving coils 41 drive the vibration block 43 to vibrate using interaction forces between the driving coils 41 and the secondary magnets 32, thereby achieving vibration feedback of the sounder. In this way, the sounder can have both vibration feedback and voice feedback functions, and the increase in thickness of the sounder can be reduced.

Referring to FIGS. 3, 4, 8 and 17, the vibration block 43 includes a main body 431 of vibration block and a bending part 432 of vibration block bending from an outer edge of the main body 431 of vibration block. A second through hole 433 is defined on the main body 431 of vibration block. An orthographic projection of the main magnet 31 along the first direction D1 falls in the second through hole 433, and both of an orthographic projection of each driving coil group of the at least one driving coil group along the first direction D1 and an orthographic projection of each secondary magnet group of the at least one secondary magnet group along the first direction D1 partially fall in the second through hole 433.

Referring to FIGS. 3, 4, 10 and 19, the vibration system 40 further includes a support plate 44 having some support ribs 441, and there is a spacing between each two adjacent support ribs 441. A bottom of the support plate 44 supports on a bottom surface of the accommodating cavity 11, and a top of the support plate 44 abuts on a bottom of the main body 431 of vibration block and partially covers the second through hole 433. A bottom of the magnet yoke 37 supports on the support ribs 441. In the first direction D1, there are overlapped parts between the magnetic yoke 37 and the main body 431 of vibration block, which is beneficial for reducing the overall height of the sounder.

In some embodiments, several grooves are defined on the main body 431 of vibration block. The driving coils 41 are at least partially embedded in the grooves, and the remaining parts are located on a side of the second through hole 433. There are overlapped parts between the driving coils 41 and the main body 431 of vibration block, which is conducive to reducing the overall height of the sounder.

Figure 9:
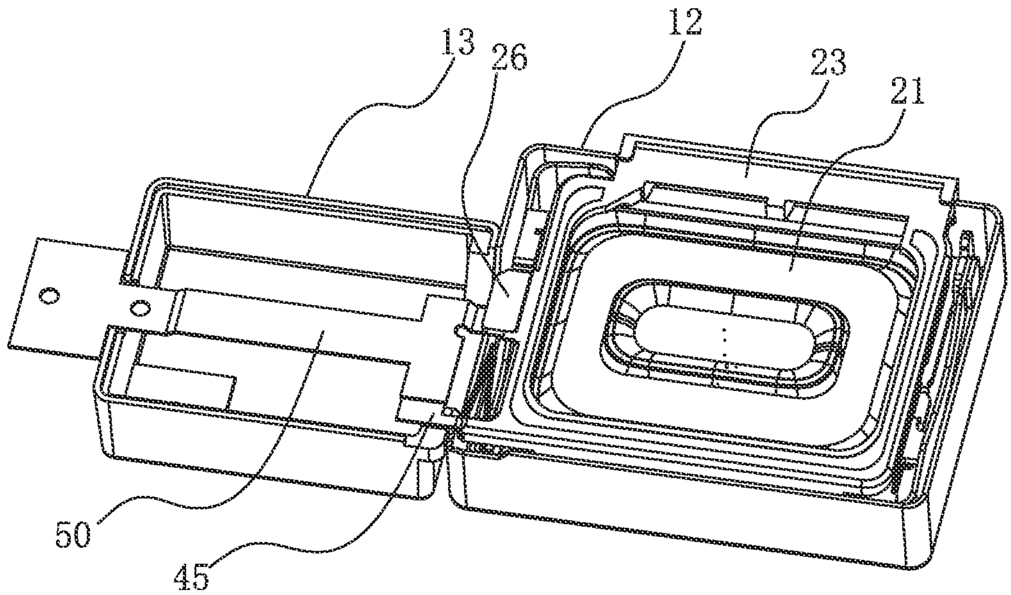
FIG. 9 is an axonometric view of the multifunctional sounder with a cover plate being omitted according to some embodiments of the present disclosure.
Figure 10:
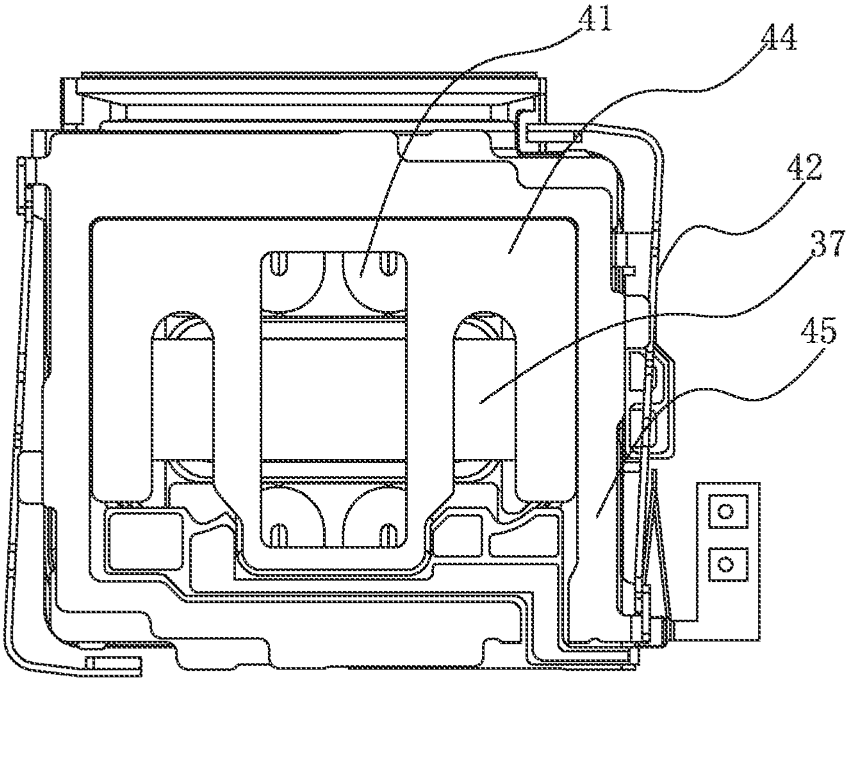
FIG. 10 is a bottom view of the multifunctional sounder with the casing being omitted according to some embodiments of the present disclosure.

Referring to FIGS. 8 and 9, the vibration system 40 further includes a first flexible circuit board 45. One end of the first flexible circuit board 45 is in signal connection with the driving coils 41, and a main body of the first flexible circuit board 45 abuts on a surface of a vibration plate. The main body of the first flexible circuit board 45 has wave-like sections configured to resist the force caused by vibration. The other end of the first flexible circuit board 45 is in signal connection with a main circuit board 50.

Figure 18:
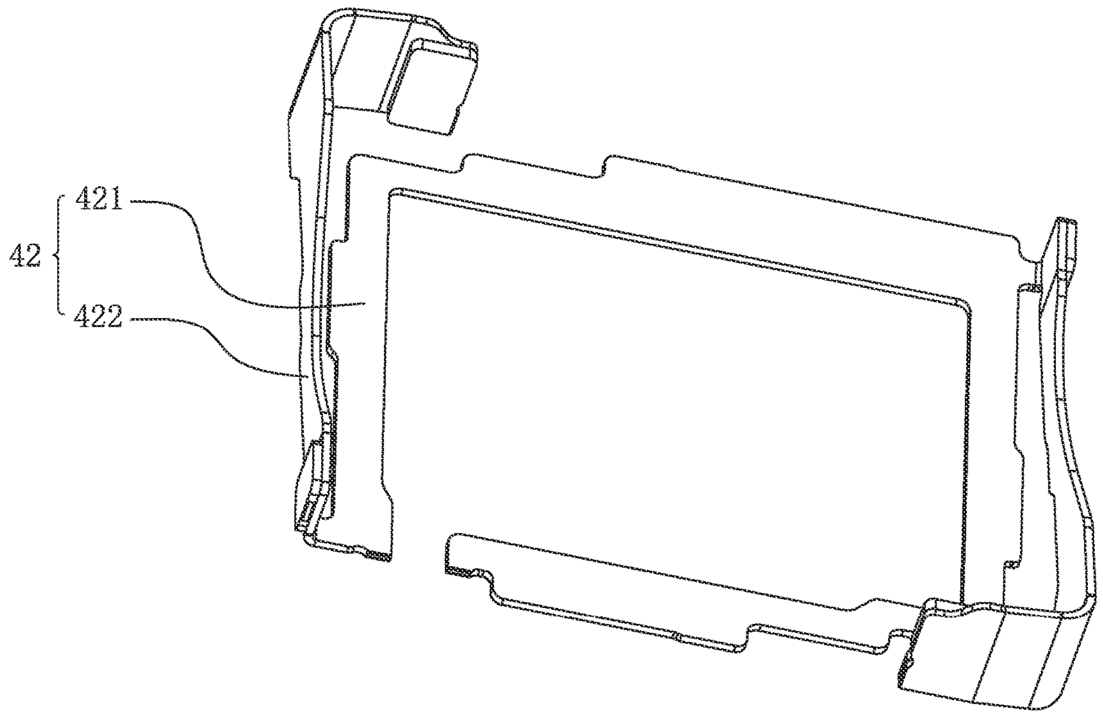
FIG. 18 is an axonometric view of the elastic connecting part according to some embodiments of the present disclosure.
Figure 19:
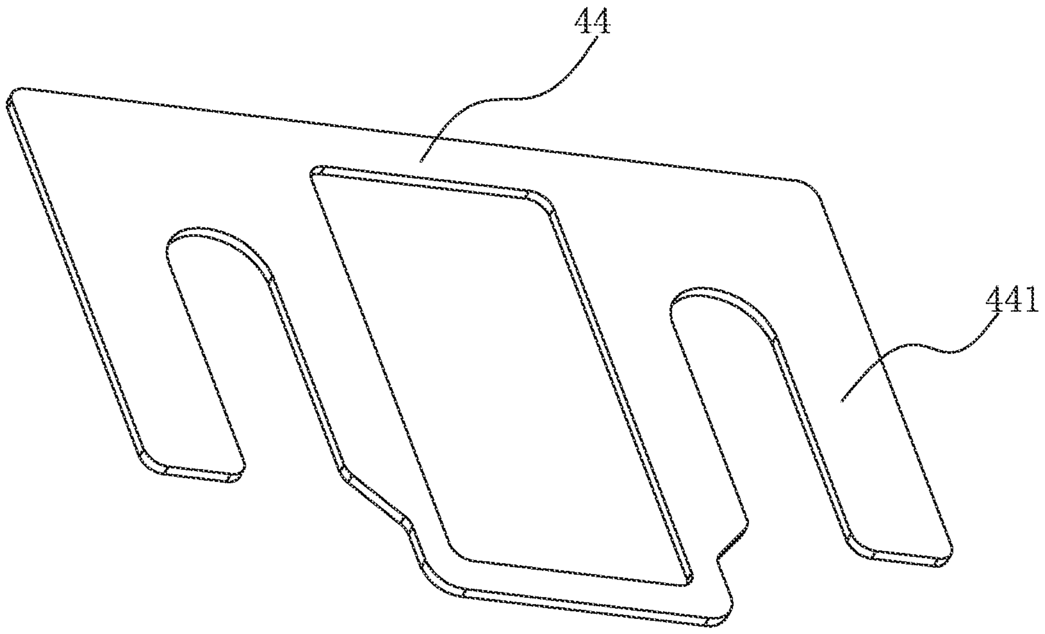
FIG. 19 is an axonometric view of a support plate according to some embodiments of the present disclosure.

Referring to FIG. 18, the elastic connecting part 42 includes a planar support part 421 and a vertical connecting part 422 extending along the first direction D1, and an extension direction of the planar support part 421 is perpendicular to that of the vertical connecting part 422. The main body 431 of vibration block supports on the planar support part 421. The vertical connecting part 422 has a bended structure to improve stability and reliability during vibration. One end of the vertical connecting part 422 may be connected to the casing 10 by a sticky adhesive part, and the other end of the vertical connecting part 422 may be connected to the bending part 432 of vibration block by a sticky adhesive part. The bottom and lateral parts of the vibration block 43 are supported by or abut against the elastic connecting part 42, thereby improving the vibration stability and installation reliability of the vibration block 43.

Figure 6:
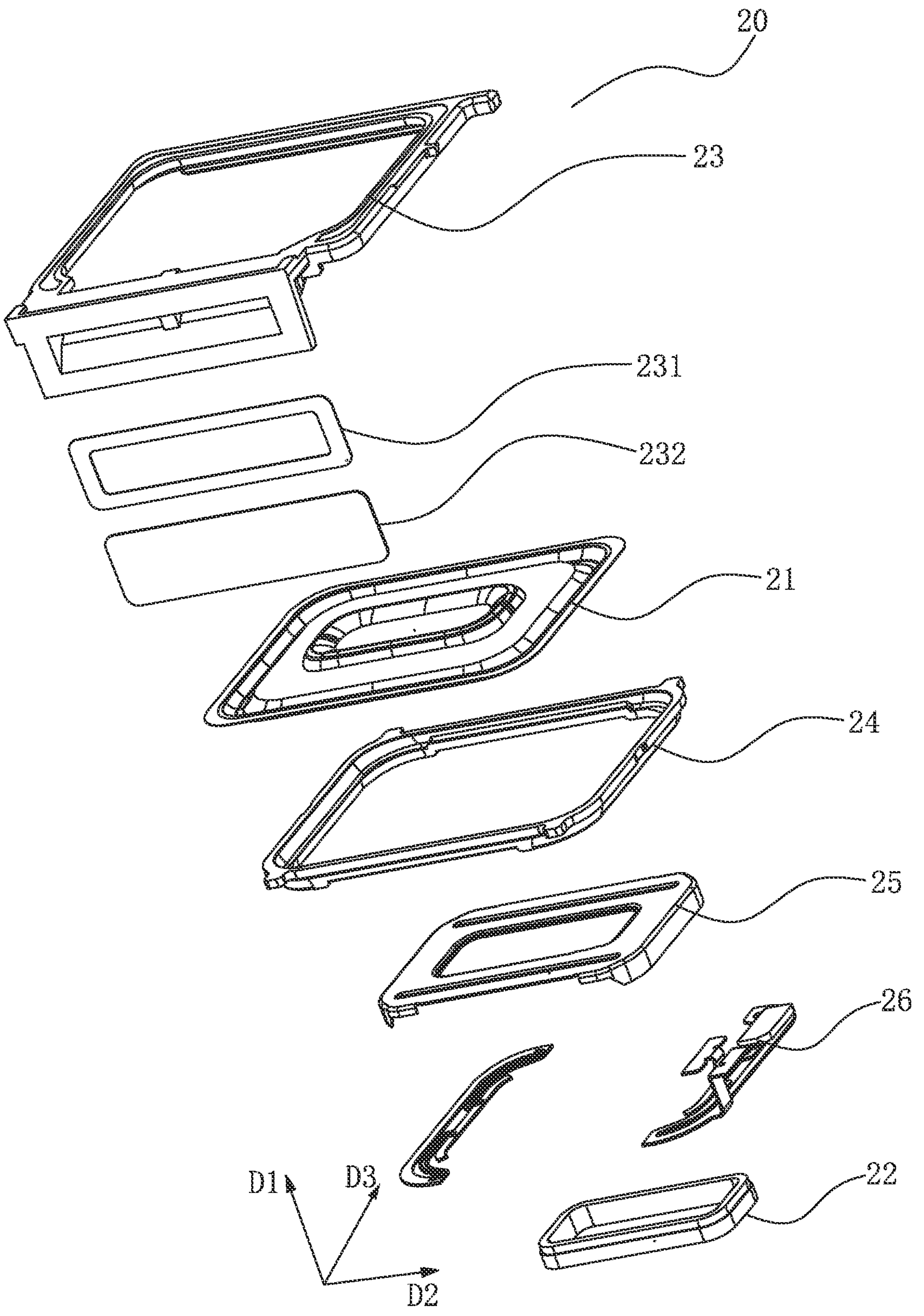
FIG. 6 is an exploded schematic diagram of the sounding diaphragm system according to some embodiments of the present disclosure.

Referring to FIGS. 3, 4 and 6, the sounding diaphragm system 20 includes a sounding diaphragm 21 and a sounding coil 22 inserted in the magnetic gap 33. The sounding diaphragm 21 divides the accommodating cavity 11 into the front cavity 111 and the back cavity 112. The sounding coil 22 vibrates under the action of the main magnet 31 and the secondary magnets 32 to achieve the vibration of the sounding diaphragm system 20, thereby realizing the voice feedback prompt function of the multifunctional sounder. When the sounding coil 22 is fed with alternating current, under the action of the magnetic field, an alternating driving force will be applied on the sounding coil 22, thereby generating alternating motion, and driving the sounding diaphragm 21 to vibrate together. The sounding diaphragm 21 then drives air to produce sound.

The sounding diaphragm system 20 further includes a sound-emitting block 23, a cone bracket 24 and a framework 25.

Figure 12:
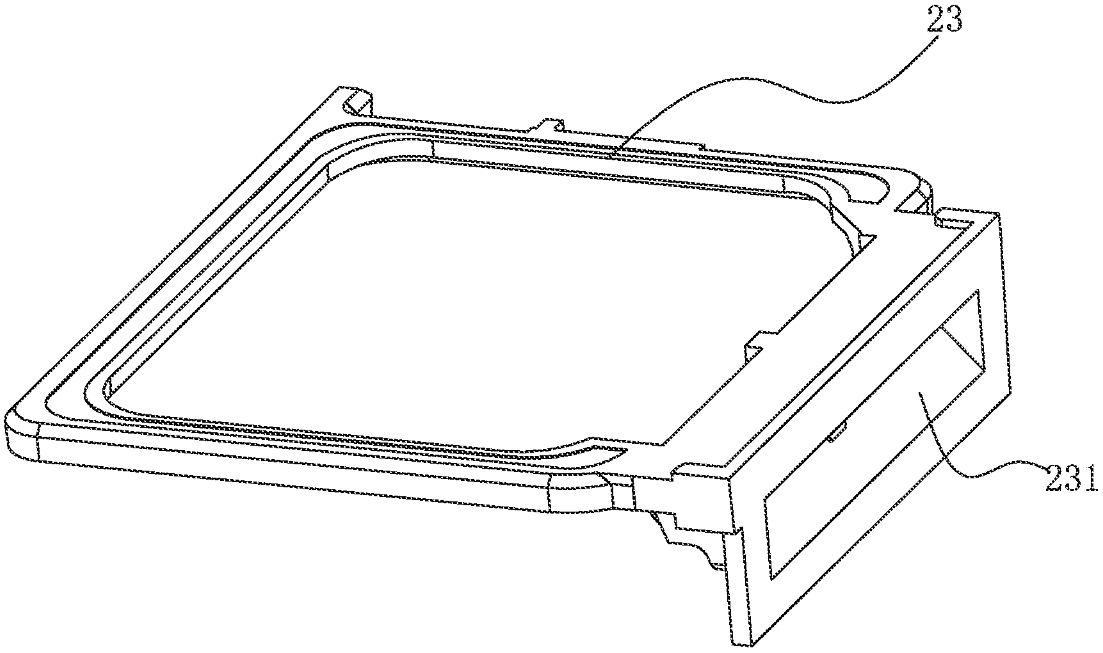
FIG. 12 is an axonometric view of a sound-emitting block according to some embodiments of the present disclosure.
Figure 13:
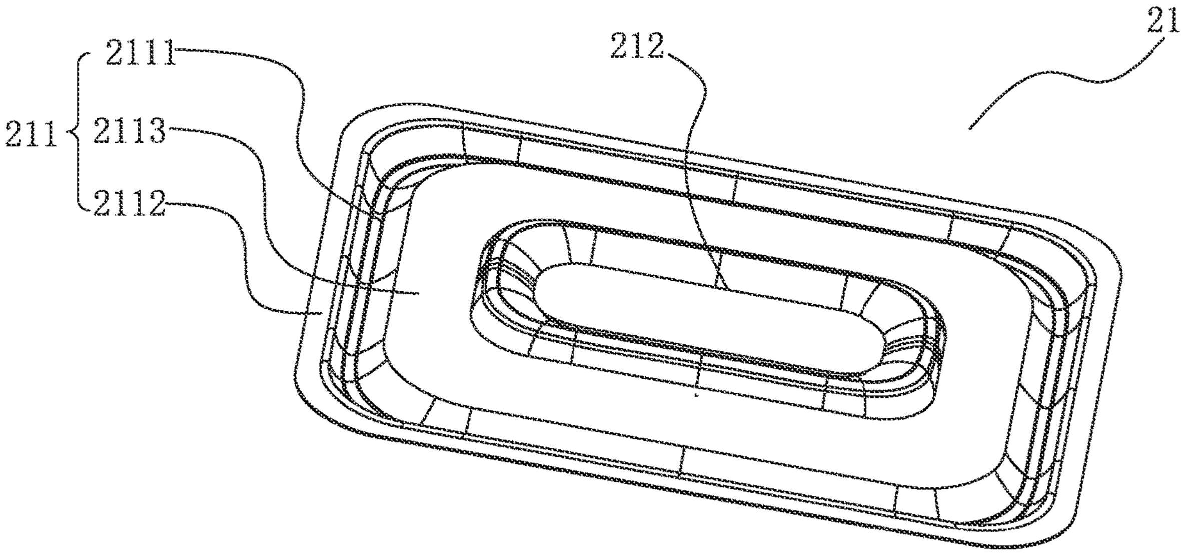
FIG. 13 is an axonometric view of a sounding diaphragm according to some embodiments of the present disclosure.
Figure 14:
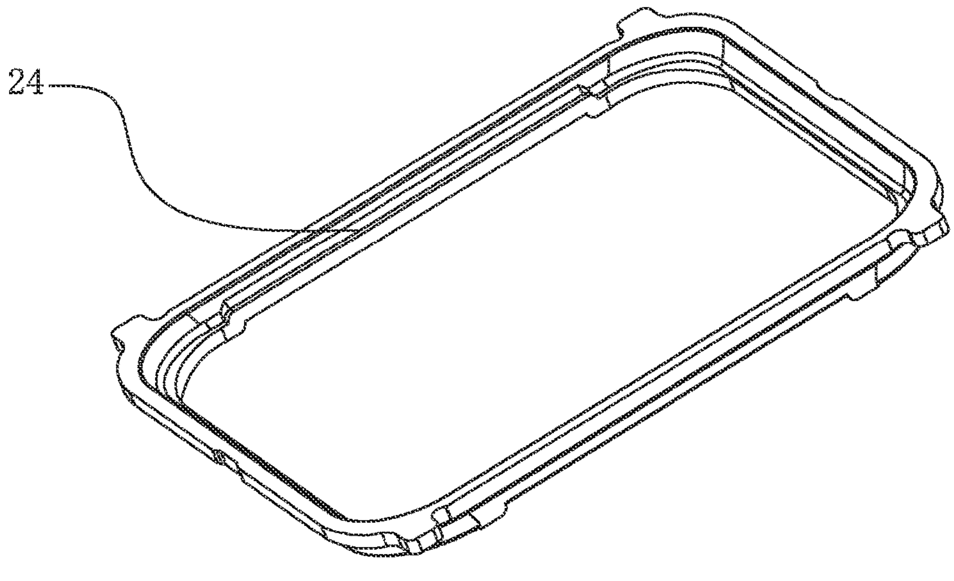
FIG. 14 is an axonometric view of a cone bracket according to some embodiments of the present disclosure.

Referring to FIGS. 3, 4 and 12, a sound-emitting channel 231 is defined on the sound-emitting block 23, and the sound-emitting channel 231 communicates with the front cavity 111 and the sound-emitting opening 121, such that the sounder communicates with external environment only through the sound-emitting channel 231. A sealing ring 232 and a sealing plate 233 are arranged at a sound-emitting end of the sound-emitting channel 231. The sealing ring 232 has an annulus structure and surround the sound-emitting end of the sound-emitting channel 231. The sealing plate 233 covers the sealing ring 232, thereby sealing the sound-emitting end of the sound-emitting channel 231.

The cone bracket 24 is configured to support the sounding diaphragm 21. Referring to FIGS. 3, 4, 13 and 14, the sounding diaphragm 21 includes a vibration diaphragm 211 and a dome 212. The vibration diaphragm 211 includes a first curved annulus 2111, a first outer flanging 2112 formed by extending from an outer edge of the first curved annulus 2111 and a first inner flanging 2113 formed by extending from an inner edge of the first curved annulus 2111. A bottom of the first outer flanging 2112 is fixed on the cone bracket 24, and the sound-emitting block 23 supports on a top of the first outer flanging 2112. The first inner flanging 2113 is connected to the dome 212, and a bottom of the first inner flanging 2113 is fixed on the framework 25. On the one hand, the framework 25 is fixedly connected with the sounding coil 22, thereby enabling the sounding coil 22 to drive the sounding diaphragm 21 to vibrate. On the other hand, the force transmission between the dome 212 and the first curved annulus 2111 can be broke off, thereby allowing the dome 212 and the first curved annulus 2111 to vibrate independently.

Figure 15:
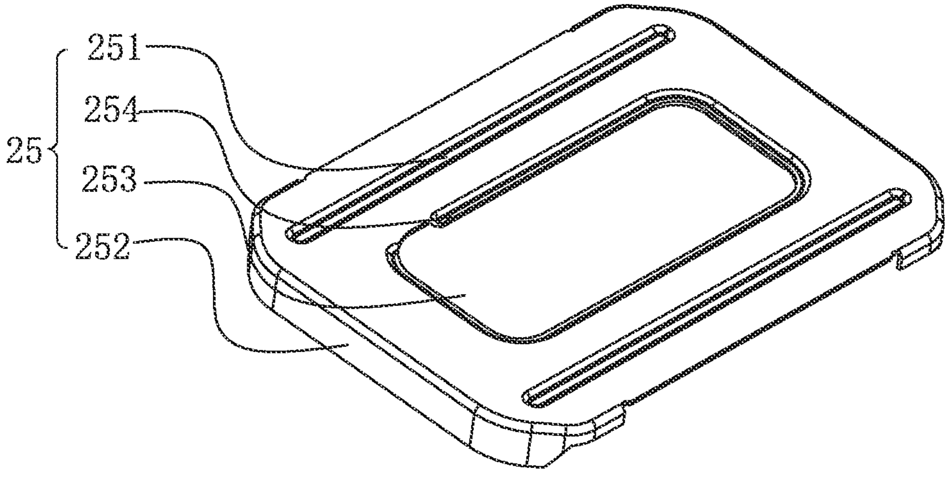
FIG. 15 is an axonometric view of a framework according to some embodiments of the present disclosure.
Figure 16:
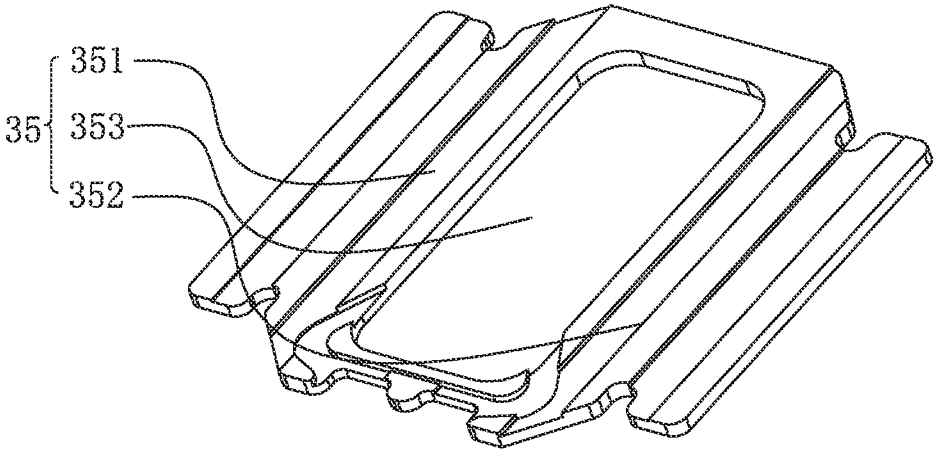
FIG. 16 is an axonometric view of the secondary pole core according to some embodiments of the present disclosure.
Figure 17:
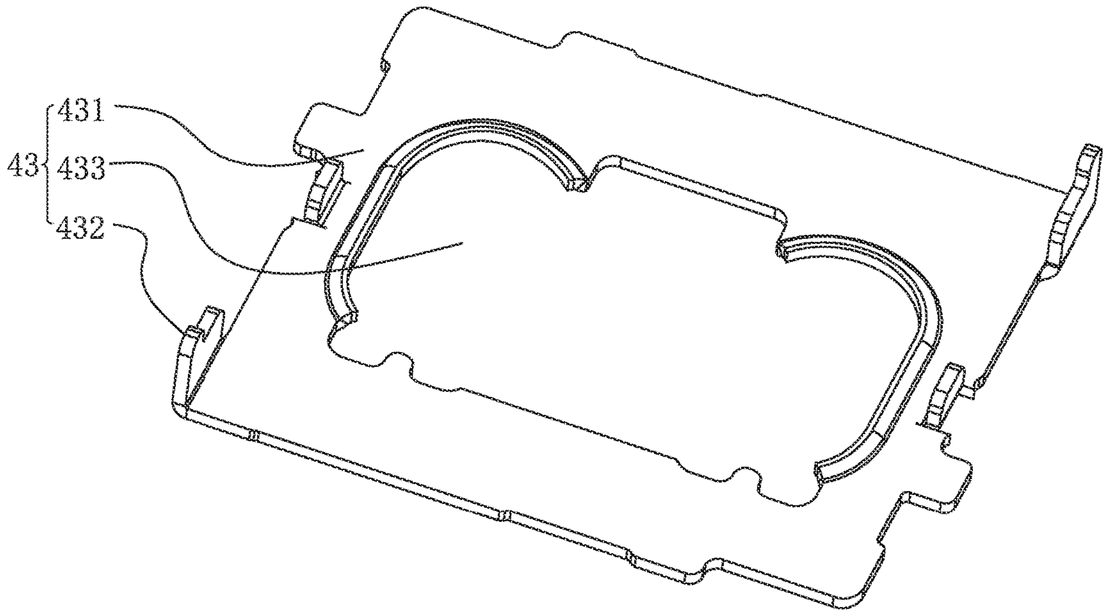
FIG. 17 is an axonometric view of the vibration block according to some embodiments of the present disclosure.

Referring to FIG. 15, the framework 25 includes a main body 251 of framework and a bending part 252 of framework formed by bending from an outer edge of the main body 251 of framework. The first inner flanging 2113 is fixed on the main body 251 of framework. A third through hole 253 is defined on a middle portion of the main body 251 of framework. An inner edge of the third through hole 253 is bended to form an installing part 254 of framework. The sounding coil 22 is fixed on the installing part 254 of framework.

Referring to FIGS. 3, 4, 9, 10 and 11, the sounding diaphragm system 20 further includes a second flexible circuit board 26 configured for electrical connection with the sounding coil 22. One end of the second flexible circuit board 26 is connected to the main body 251 of framework, and the other end is connected to the main circuit board 50. A main body of the second flexible circuit board 26 abuts on a bottom of the cone bracket 24.

Referring to FIGS. 3, 4, 5 and 10, the casing 10 includes a main casing 12 and a secondary casing 13 fixed on a side of the main casing 12. The accommodating cavity 11 is formed in the main casing 12. The main casing 12 and the secondary casing 13 both have an opened box structure. A cover plate 14 covers an opening to close the opening. One end of the first flexible circuit board 45 and one end of the second flexible circuit board 26 extend out of the main casing 12 and are electrically connected to one end of the main circuit board 50. The main body of the main circuit board 50 is arranged inside the secondary casing 13, and the other end of the main circuit board 50 extends out of the secondary casing 13.

The above embodiments based on the schematic diagram provide a detailed description of the structures, features, and effects of the present disclosure. The above are only preferred embodiments of the present disclosure, but the scope of implementation is not limited by the drawings. Any changes made according to the concept of the present disclosure, or equivalent embodiments modified to equivalent changes, still do not exceed the spirit of the description and drawings, shall be within the scope of protection of the present disclosure.

What is claimed is:

1. A multifunctional sounder, comprising:
- a casing, having an accommodating cavity;
- a sounding unit, arranged in the accommodating cavity; and
- at least one driving coil group, arranged in the accommodating cavity;
- wherein the sounding unit includes a sounding diaphragm system and a magnetic circuit system configured to drive the sounding diaphragm system to vibrate and sound along a first direction;
- wherein the magnetic circuit system includes a main magnet and at least one secondary magnet group arranged to surround the main magnet to form a magnetic gap, each secondary magnet group of the at least one secondary magnet group includes a plurality of secondary magnets arranged in a second direction, each two adjacent secondary magnets of the plurality of secondary magnets have polarities opposite to each other, and the second direction is perpendicular to the first direction; and
- wherein each driving coil group of the at least one driving coil group includes at least one driving coil, each driving coil group of the at least one driving coil group corresponds to a respective secondary magnet group of the at least one secondary magnet group, and an orthographic projection of each driving coil group of the at least one driving coil group along the first direction misalign with the main magnet.

2. The multifunctional sounder according to claim 1, wherein in the second direction, one respective driving coil is arranged over an intermediate region between two respective adjacent secondary magnets of the plurality of secondary magnets, the one respective driving coil includes a first coil portion and a second coil portion, an orthographic projection of the first coil portion along the first direction falls on one secondary magnet of the two respective adjacent secondary magnets, and an orthographic projection of the second coil portion along the first direction falls on an other secondary magnet of the two respective adjacent secondary magnets.

3. The multifunctional sounder according to claim 2, wherein the first coil portion and the second coil portion are enclosed to form a through hole for magnetic flux lines arranged over the intermediate region between the two respective adjacent secondary magnets.

4. The multifunctional sounder according to claim 1, wherein each secondary magnet group of the at least one secondary magnet group includes three secondary magnets, each driving coil group of the at least one driving coil group includes two driving coils, and each driving coil of the two driving coils corresponds to two respective adjacent secondary magnets of the three secondary magnets.

5. The multifunctional sounder according to claim 1, including two driving coil groups symmetrically arranged on either sides of the main magnet along a third direction, wherein the magnetic circuit system includes two secondary magnet groups symmetrically arranged on either sides of the main magnet along the third direction, and the first direction is perpendicular to a plane formed by the second direction and the third direction.

6. The multifunctional sounder according to claim 5, wherein the magnetic circuit system further includes a main pole core arranged on the main magnet and a secondary pole core including a first secondary pole core portion and a second secondary pole core portion; and
- wherein the first secondary pole core portion is arranged on one secondary magnet group of the two secondary magnet groups, the second secondary pole core portion is arranged on an other secondary magnet group of the two secondary magnet groups, and the first secondary pole core portion and the second secondary pole core portion are enclosed to form a first through hole arranged to align with the main magnet.

7. The multifunctional sounder according to claim 6, wherein the magnetic circuit system further includes an upper magnet arranged on a side of the main pole core away from the main magnet.

8. The multifunctional sounder according to claim 1, wherein an elastic connecting part and a vibration block are arranged in the accommodating cavity, the at least one driving coil group is arranged on the vibration block, and the elastic connecting part is connected between the casing and the vibration block.

9. The multifunctional sounder according to claim 8, wherein a second through hole is defined on the vibration block, an orthographic projection of the main magnet along the first direction falls in the second through hole, and both of an orthographic projection of each driving coil group of the at least one driving coil group along the first direction and an orthographic projection of each secondary magnet group of the at least one secondary magnet group along the first direction partially fall in the second through hole.

10. The multifunctional sounder according to claim 1, wherein the magnetic circuit system further includes a magnet yoke arranged to align with the main magnet, and an orthographic projection of each secondary magnet group of the at least one secondary magnet group along the first direction misaligns with the magnet yoke.

* * * * *